«12» United States Patent
Hong et al.

(10) Patent No.: US 9,033,346 B2
(45) Date of Patent: May 19, 2015

(54) GASKET FOR VEHICLE

(75) Inventors: Jin Won Hong, Yongin-si (KR); Dong Ho Chu, Ansan-si (KR); Yonghoon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 339 days.

(21) Appl. No.: 13/586,211

(22) Filed: Aug. 15, 2012

(65) Prior Publication Data

US 2013/0134683 A1   May 30, 2013

(30) Foreign Application Priority Data

Nov. 29, 2011  (KR) .................... 10-2011-0126334

(51) Int. Cl.
*F02F 11/00* (2006.01)
*F16J 15/06* (2006.01)
*F16J 15/08* (2006.01)

(52) U.S. Cl.
CPC ............ *F16J 15/061* (2013.01); *F16J 15/0825* (2013.01); *F16J 15/0831* (2013.01); *F16J 2015/085* (2013.01)

(58) Field of Classification Search
CPC . F16J 15/0825; F16J 15/0818; F16J 15/0887; F16J 15/0893
USPC ................................................... 277/592–594
See application file for complete search history.

(56) References Cited

U.S. PATENT DOCUMENTS

| 5,725,223 | A | * | 3/1998 | Yamada et al. ............... 277/595 |
| 5,924,701 | A | * | 7/1999 | Schweiger ..................... 277/597 |
| 5,979,906 | A | * | 11/1999 | Silvian ........................... 277/593 |
| 6,155,045 | A | * | 12/2000 | Durr et al. ........................ 60/323 |
| 2004/0217552 | A1 | * | 11/2004 | Sueda ............................ 277/592 |

* cited by examiner

*Primary Examiner* — Vishal Patel
(74) *Attorney, Agent, or Firm* — Morgan, Lewis & Bockius LLP

(57) ABSTRACT

A gasket for a vehicle is configured to improve performance of a turbocharger according to enhanced sealing performance. The gasket is disposed at a coupling portion of a cylinder head of an engine and an exhaust manifold adapted to supply exhaust gas from the cylinder head to a turbocharger.

3 Claims, 4 Drawing Sheets

GASKET FOR VEHICLE

CROSS-REFERENCE TO RELATED APPLICATION

The present application claims priority of Korean Patent Application Number 10-2011-0126334 filed Nov. 29, 2011, the entire contents of which application is incorporated herein for all purposes by this reference.

BACKGROUND OF INVENTION

1. Field of Invention

The present invention relates to a gasket for a vehicle. More particularly, the present invention relates a gasket for a vehicle provided to an exhaust manifold.

2. Description of Related Art

Generally, engine output per cycle can be increased when pressure of intake air flowing into a cylinder of an engine is increased to higher than atmospheric pressure and an air amount in the cylinder is increased. This is called supercharging. Mechanical supercharging deteriorates thermal efficiency even though crankshaft power is increased since output of a crankshaft is used for compressing the intake air.

In order to solve the problem, a turbocharger has been developed. According to the turbocharger, a compressor fixedly connected with an exhaust turbine feeds air into the cylinder when the exhaust turbine is operated by energy from exhaust gas. Therefore, engine output is improved. The turbocharger is widely used with diesel engines where a knocking problem does not generally occur as opposed to a gasoline engine where knocking occurs if the pressure in the cylinder is excessively increased by supercharging.

In detail, in the turbocharger, a turbine wheel that recovers exhaust energy and a compressor wheel that delivers compressed air to the cylinder are disposed on respective ends of the same shaft, and a housing for leading flow of the exhaust gas and the air covers each wheel. Particularly, the turbine housing is divided into a single scroll type having one exhaust gas passage and a twin scroll type having two exhaust gas passages divided by a partition. The twin scroll type prevents exhaust interference of the engine and efficiently uses a pulse effect of the exhaust, and thus rotation efficiency of the turbine wheel can be improved.

Meanwhile, the turbocharger is connected with an exhaust manifold, and a gasket is provided on a surface where the exhaust manifold is assembled with the cylinder head of the engine. In addition, a shape of the gasket corresponds to a shape of the surface where the exhaust manifold and the cylinder head are coupled with each other. Further, the gasket seals by using elastic force of a bead in which a stainless steel material of a thin plate is processed by embossing molding.

However, in the turbocharger using the twin scroll type, a part of the exhaust manifold has a large cross-section so as to secure a space where the twin scroll is formed. In addition, a part of the exhaust manifold having the large cross-section cannot be directly engaged with the cylinder head. In other words, a disengaged portion of the gasket is formed. Thus, at the disengaged portion, leakage of exhaust gas may occur since an engaging force between the cylinder head and the exhaust manifold deteriorates.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a gasket for a vehicle having advantages of improving performance of a turbocharger according to enhance sealing performance.

Various aspects of the present invention provide for a gasket for a vehicle disposed at a coupling portion of a cylinder head of an engine and an exhaust manifold adapted to supply exhaust gas from the cylinder head to a turbocharger.

The gasket may include an engaging hole, an engaging member for coupling the cylinder head with the exhaust manifold penetrating the engaging hole, an exhaust hole adapted to flowing the exhaust gas into the exhaust manifold, and including at least one first exhaust hole disposed between engaging holes having a relatively long distance therebetween and at least one second exhaust hole disposed between the engaging having a relatively short distance therebetween, a double half bead portion formed around the first exhaust hole, and a half bead portion formed around the second exhaust hole, wherein the double half bead portion is formed by overlapping a plurality of double half beads, the double half beads including a first side land surface formed horizontally, a first slanted surface slantedly extended from one end of the first side land surface, a center land surface horizontally extended from one end of the first slanted surface, a second slanted surface extended from one end of the center land surface and formed symmetrically with the first slanted surface with respect to the center land surface, and a second side land surface extended from one end of the second slanted surface and formed symmetrically with the first side land surface with respect to the center land surface, and wherein the half bead portion is formed by overlapping a plurality of half beads, the half bead including a first land surface formed horizontally, a slanted surface slantedly extended from one end of the first land surface, and a second land surface horizontally extended from one end of the slanted surface.

The plurality of double half beads may include first, second, third, and fourth double half beads.

The first and second double half beads may be formed with a space by contacting the first side land surfaces of the first and second double half beads with each other, contacting the second side land surfaces of the first and second double half beads with each other, and distancing the center land surfaces of the first and second double half beads from each other, the center land surfaces of the second and third double half beads may contact each other, the first side land surfaces of the second and third double half beads may be disposed apart from each other, and the second side land surfaces of the second and third double half beads may be disposed apart from each other, and the third and fourth double half beads may be formed with a space by contacting the first side land surfaces of the third and fourth double half beads with each other, contacting the second side land surfaces of the third and fourth double half beads with each other, and distancing the center land surfaces of the third and fourth double half beads from each other.

The plurality of half beads may include first, second, third, and fourth half beads.

The first land surfaces of the first and second half beads may contact each other, the second land surfaces of the first and second half beads may be disposed apart from each other, the second land surfaces of the second and third half beads may contact each other, the first land surfaces of the second and third half beads may be disposed apart from each other, the first land surfaces of the third and fourth half beads may contact each other, and the second land surfaces of the third and fourth half beads may be disposed apart from each other.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
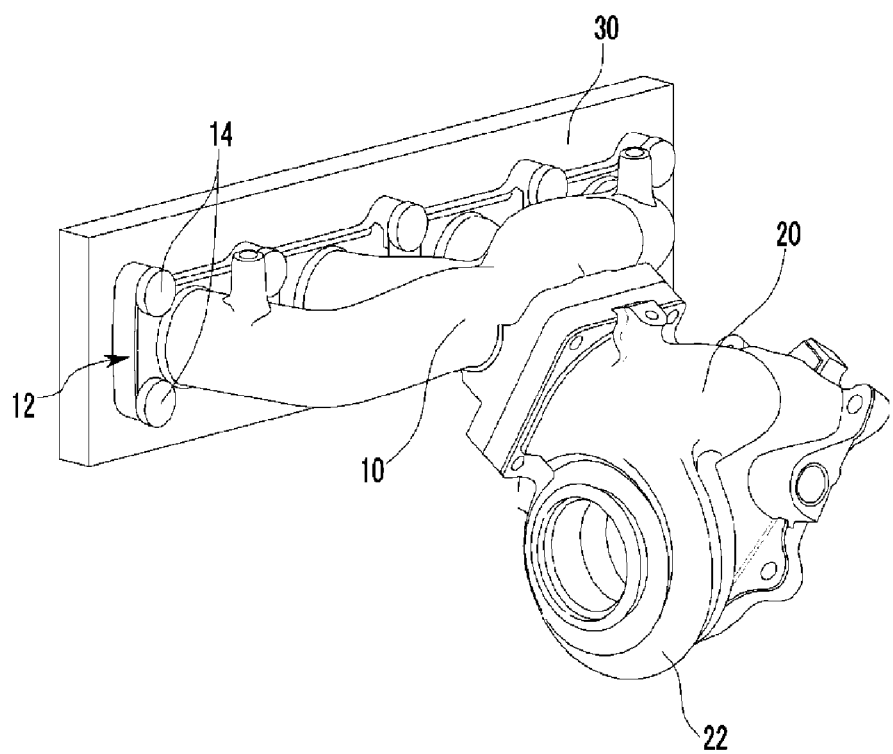
FIG. 1 is a perspective view of an exemplary exhaust manifold and turbocharger according to the present invention.

FIG. 1 is a perspective view of an exhaust manifold and a turbocharger according to various embodiments of the present invention.

As shown in FIG. 1, an exhaust manifold 10 includes coupling portion 12, and a turbocharger 20 includes twin scroll portion 22.

The exhaust manifold 10 is a passage adapted to supply exhaust gas from a cylinder head 30 to the turbocharger 20.

The coupling portion 12 is formed for coupling the exhaust manifold 10 and the cylinder head 30 with each other. In addition, a plurality of engaging members 14 are provided at the coupling portion 12. Each engaging member 14 may be a bolt, and the exhaust manifold 10 and a cylinder head 30 are coupled with each other by the engaging members 14. Further, a gasket 100 is provided at the coupling portion 12. The gasket 100 performs sealing at the coupling portion 12 of components so as to prevent leakage of water, oil, and exhaust gas. In other words, the gasket 100 is disposed between the exhaust manifold 10 and the cylinder head 30.

The twin scroll portion 22 is a part of the turbocharger 20 for forming a twin scroll. Herein, the twin scroll is an exhaust gas passage divided into two passages in a scroll portion of the turbocharger 20. The twin scroll is well-known to a person of ordinary skill in the art such that a detailed description thereof will be omitted.

The cross-section of a part of the exhaust manifold 10 becomes large because of the twin scroll portion 22 forming a twin scroll. In addition, the large cross-section of the part of the exhaust manifold 10 influences a shape of the gasket 100 corresponding to a shape of the surface where the exhaust manifold 10 and the cylinder head 30 are connected.

Figure 2:
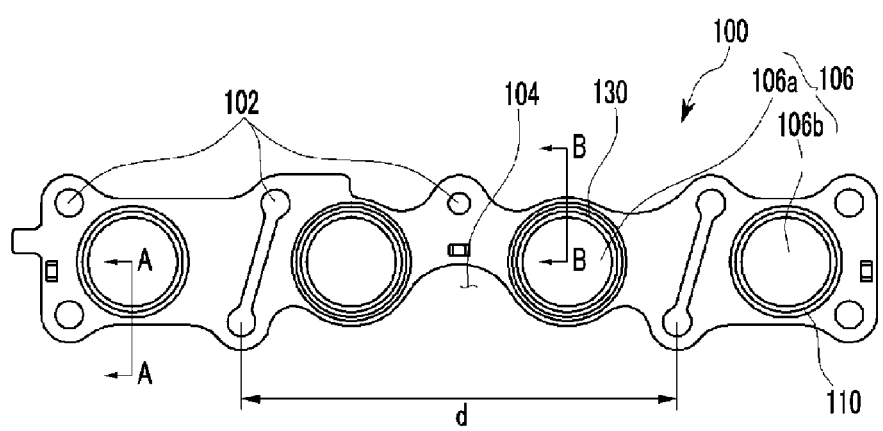
FIG. 2 is a top plan view of an exemplary gasket according to the present invention.

FIG. 2 is a top plan view of a gasket according to various embodiments of the present invention.

As shown in FIG. 2, the gasket 100 includes an engaging hole 102, a disengaged portion 104, and an exhaust hole 106.

Multiple engaging holes 102 are formed such that a plurality of engaging member 14 penetrate the gasket 100. In addition, engaging holes 102 may be formed along a circumference of the gasket 100. Meanwhile, positions of engaging holes 102 can be changed by a person of ordinary skill in the art such that the engaging force of the exhaust manifold 10 and the cylinder head 30 is increased and the sealing performance of the gasket 100 is improved.

The disengaged portion 104 is a portion where the engaging hole 102 cannot be formed since the cross-section of a part of the exhaust manifold 10 becomes large because of the twin scroll portion 22. In other words, the shape of the surface where the exhaust manifold 10 and the cylinder head 30 are connected is changed according to the shape of the cross-section of the exhaust manifold 10. Thus, the disengaged portion 104 is formed at the gasket 100 which is formed in a shape corresponding to the shape of the surface.

Meanwhile, a width (d) between two engaging holes 102 where the disengaged portion 104 is formed is longer than a width between other engaging holes 102. Therefore, a supplement of sealing performance is demanded near the disengaged portion 104.

The exhaust hole 106 is adapted to flow the exhaust gas into the exhaust manifold 10. In addition, the exhaust hole 106 include at least one first exhaust hole 106a and one second exhaust hole 106b. The first exhaust hole 106a is disposed between the engaging holes having a relatively long distance therebetween, and the second exhaust hole 106b is disposed between the engaging holes having a relatively short distance therebetween. In other words, the first exhaust hole 106a is disposed near the disengaged portion 104. Herein, a double half bead portion 130 is formed around the first exhaust hole 106a, and a half bead portion 110 is formed around the second exhaust hole 106b.

Figure 3:
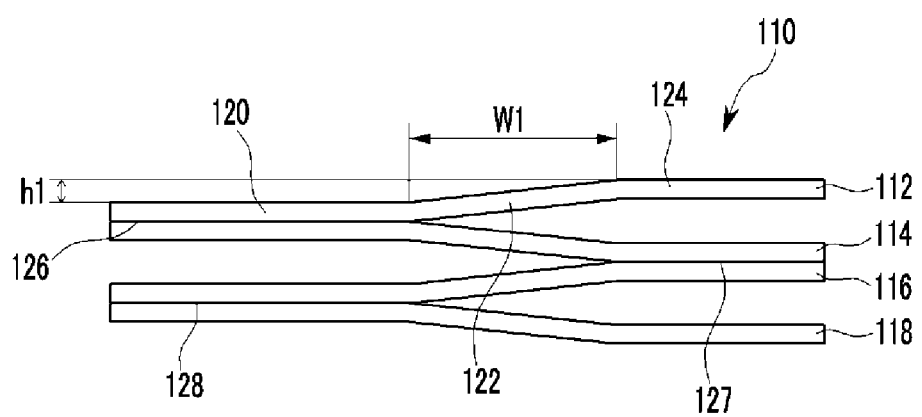
FIG. 3 is a cross-sectional view of the exemplary gasket taken along a line A-A in FIG. 2.

FIG. 3 is a cross-sectional view of a gasket taken along a line A-A in FIG. 2.

As shown in FIG. 3, the half bead portion 110 includes a first half bead 112, a second half bead 114, a third half bead 116 and a fourth half bead 118. In addition, the half bead portion 110 is formed by sequentially overlapping the first half bead 112, the second half bead 114, the third half bead 116 and the fourth half bead 118.

The first half bead 112 includes a first land surface 120 formed horizontally, a slanted surface 122 slantedly extended from one end of the first land surface 120, and a second land surface 124 horizontally extended from the extended end of the slanted surface 122.

The second, third, and fourth half beads 114, 116, and 118 include the first land surface 120, the slanted surface 122, and the second land surface 124, like the first half bead 112. In addition, the first and third half beads 112 and 116 may be formed in the same shape as the slanted surface 122 that is slanted upwardly from the first land surface 120 to the second land surface 124. Further, the second and fourth half beads 114 and 118 may be formed in the same shape as the slanted surface 122 that is slanted downwardly from the first land surface 120 to the second land surface 124.

Each the first land surfaces 120 of the first and second half beads 112 and 114 are overlapped so as to not be misaligned with each other. In addition, each the second land surfaces 124 of the first and second half beads 112 and 114 are disposed apart from each other. Further, the first half bead 112 and the second half bead 114 are formed symmetrically with respect to the first half bead contacting surface 126 where each of the first land surface 120 of the first half bead 112 and the second half bead 114 are overlapped.

Each of the second land surfaces 124 of the second and third half beads 114 and 116 are overlapped so as to not be misaligned with each other. In addition, each the first land surfaces 120 of the second and third half beads 114 and 116 are disposed apart from each other. Further, the second half bead 114 and the third half bead 116 are formed symmetrically with respect to the second half bead contacting surface 127 where each of the second land surfaces 124 of the second half bead 114 and the third half bead 116 are overlapped.

Each of the first land surfaces 120 of the third and fourth half beads 116 and 118 are overlapped so as to not be misaligned with each other. In addition, each the second land surface 124 of the third and fourth half beads 116 and 118 are disposed apart from each other. Further, the third half bead 116 and the fourth half bead 118 are formed symmetrically with respect to the third half bead contacting surface 128 where each of the first land surfaces 120 of the third half bead 116 and the fourth half bead 118 are overlapped.

The elastic force of the half bead portion 110 is determined by a height h1 and a horizontal distance w1 of the slanted surface 122. In addition, each of the slanted surfaces 122 of the first, second, third, and fourth half beads 112, 114, 116, and 118 are formed with the same height h1 and horizontal distance w1.

Meanwhile, the height h1 of the slanted surface 122 may be 0.5 mm and the horizontal distance w1 may be 2.5 mm. In addition, the height h1 and horizontal distance w1 of the slanted surfaces 122 can be changed by a person of ordinary skill in the art.

Figure 4:
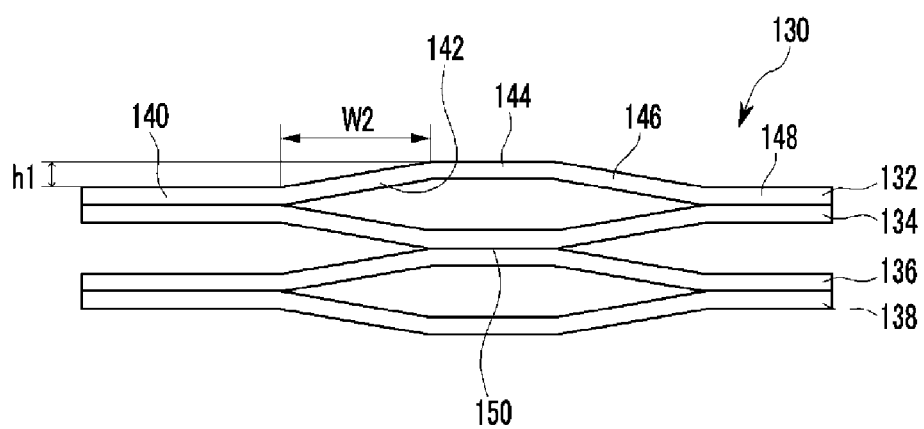
FIG. 4 is a cross-sectional view of the exemplary gasket taken along a line B-B in FIG. 2.

FIG. 4 is a cross-sectional view of a gasket taken along a line B-B in FIG. 2.

As shown in FIG. 4, the double half bead portion 130 includes a first double half bead 132, a second double half bead 134, a third double half bead 136 and a fourth double half bead 138. In addition, the double half bead portion 130 is formed by sequentially overlapping the first double half bead 132, the second double half bead 134, the third double half bead 136 and the fourth double half bead 138.

The first double half bead 132 includes a first side land surface 140, a first slanted surface 142, a center land surface 144, a second slanted surface 146 and a second side land surface 148.

The first side land surface 140 is formed horizontally.

The first slanted surface 142 is slantedly extended from one end of the first side land surface 140.

The center land surface 144 is horizontally extended from the extended end of the first slanted surface.

The second slanted surface 146 is extended from the extended one end of the center land surface 144 and is formed symmetrically with the first slanted surface 142 with respect to the center land surface 144.

The second side land surface 148 is extended from the extended end of the second slanted surface and is formed symmetrically with the first side land surface 140 with respect to the center land surface 144.

The second, third, and fourth double half beads 134, 136, and 138 include the first side land surface 140, the first slanted surface 142, the center land surface 144, the second slanted surface 146, and the second side land surface 148, like the first double half bead 132. In addition, the first and third double half beads 132 and 136 may be formed with the same shape as that of the first slanted surface 142 that is slanted upwardly from the first side land surface 140 to the center land surface 144 and the second slanted surface 146 that is slanted downwardly from the center land surface 144 to the second side land surface 148. Further, the second and fourth double half beads 134 and 138 may be formed with the same shape as that of the first slanted surface 142 that is slanted downwardly from the first side land surface 140 to the center land surface 144 and the second slanted surface 146 that is slanted upwardly from the center land surface 144 to the second side land surface 148.

Each of the first side land surfaces 140 of the first and second double half beads 132 and 134 are overlapped so as to not be misaligned with each other. In addition, each of the second side land surfaces 148 of the first and second double half beads 132 and 134 are overlapped so as to not be misaligned with each other. Further, each of the center land surfaces 144 of the first and second double half beads 132 and 134 are disposed apart from each other. Thus, a space is formed between the first and second double half beads 132 and 134.

Each of the center land surfaces 144 of the second and third double half beads 134 and 136 are overlapped so as to not be misaligned with each other. In addition, each of the first side land surfaces 140 of the second and third double half beads 134 and 136 are disposed apart from each other. Further, the second and third double half beads 134 and 136 and each of the second side land surfaces 148 are disposed apart from each other.

Each of the first side land surfaces 140 of the third and fourth double half beads 136 and 138 are overlapped so as to not be misaligned with each other. In addition, each of the second side land surfaces 148 of the third and fourth double half beads 136 and 138 are overlapped so as to not be misaligned with each other. Further, each of the center land surfaces 144 of the third and fourth double half beads 136 and 138 are disposed apart from each other so as to form a space between each of the center land surfaces 144 of the third and fourth double half beads 136 and 138.

Meanwhile, the first and second double half beads 132 and 134 and the third and fourth double half beads 136 and 138 are formed symmetrically with respect to a center contacting surface 150 where each of the center land surfaces 144 of the second double half bead 134 and the third double half bead 136 contact each other.

Elastic force of the double half bead portion 130 is determined by a height h2 and a horizontal distance w2 of the first and second slanted surfaces 142 and 146. In addition, the height h2 and the horizontal distance w2 of the first slanted surface 142 are same as the height h2 and the horizontal distance w2 of the second slanted surface 146. Further, each of the first slanted surface 142 and the second slanted surface 146 of the first, second, third, and fourth double half beads 132, 134, 136, and 138 are formed with same height h2 and horizontal distance w2.

Meanwhile, the height h2 of the first slanted surface 142 and the second slanted surface 146 may be 0.3 mm and the horizontal distance w2 may be 1.8 mm. In addition, the height h2 and the horizontal distance w2 of the first slanted surface 142 and the second slanted surface 146 can be changed by a person of ordinary skill in the art.

According to various embodiments of the present invention, the sealing performance can be improved since the double half bead portion 130 is applied to the portion where a width between the engaging members 14 is long. Therefore, the performance of the turbocharger 20 can be enhanced. In addition, efficient sealing is possible since the half bead portion 110 and the double half bead portion 130 are mixed.

Further, the cost for manufacturing the gasket 100 is less than the cost for manufacturing a gasket using the double half bead portion 130.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gasket for a vehicle disposed at a coupling portion of a cylinder head of an engine and an exhaust manifold adapted to supply exhaust gas from the cylinder head to a turbocharger, the gasket comprising:
    engaging holes;
    engaging members for coupling the cylinder head with the exhaust manifold penetrating the engaging holes;
    exhaust holes adapted to direct the exhaust gas into the exhaust manifold, and including at least one first exhaust hole disposed between engaging holes having a relatively long distance therebetween and at least one second exhaust hole disposed between engaging having a relatively short distance therebetween;
    a double half bead portion formed around the at least one first exhaust hole; and
    a half bead portion formed around the at least one second exhaust hole;
    wherein the double half bead portion is formed by overlapping a plurality of double half beads, each of the double half beads comprising:
        a first side land surface formed horizontally;
        a first slanted surface slantedly extended from one end of the first side land surface;
        a center land surface horizontally extended from one end of the first slanted surface;
        a second slanted surface extended from one end of the center land surface and formed symmetrically with the first slanted surface with respect to the center land surface; and
        a second side land surface extended from one end of the second slanted surface and formed symmetrically with the first side land surface with respect to the center land surface,
    wherein the half bead portion is formed by overlapping a plurality of half beads, each of the half beads comprising:
        a first land surface formed horizontally;
        a slanted surface slantedly extended from one end of the first land surface; and
        a second land surface horizontally extended from one end of the slanted surface,
    wherein the plurality of double half beads comprise first, second, third, and fourth double half beads and the center land surfaces of the second and third double half beads contact each other, and
    wherein the plurality of half beads comprise first, second, third, and fourth half beads and the second land surfaces of the second and third half beads contact each other.

2. The gasket of claim 1, wherein the first and second double half beads are formed with a space by contacting the first side land surfaces of the first and second double half beads with each other, contacting the second side land surfaces of the first and second double half beads with each other and distancing the center land surfaces of the first and second double half beads from each other;
    the first side land surfaces of the second and third double half beads are disposed apart from each other, and the second side land surfaces of the second and third double half beads are disposed apart from each other; and
    the third and fourth double half beads are formed with a space by contacting the first side land surfaces of the third and fourth double half beads with each other, contacting the second side land surfaces of the third and fourth double half beads with each other and distancing the center land surfaces of the third and fourth double half beads from each other.

3. The gasket of claim 1, wherein the first land surfaces of the first and second half beads contact each other, the second land surfaces of the first and second half beads are disposed apart from each other;
    the first land surfaces of the second and third half beads are disposed apart from each other;
    the first land surfaces of the third and fourth half beads contact each other, and the second land surfaces of the third and fourth half beads are disposed apart from each other.

* * * * *